United States Patent [19]
Meister

[11] Patent Number: 5,129,386
[45] Date of Patent: Jul. 14, 1992

[54] FIRE SUPPRESSANT SYSTEM FOR A COOKING DEVICE

[75] Inventor: James L. Meister, Rockford, Ill.

[73] Assignee: The Broaster Company, Beloit, Wis.

[21] Appl. No.: 682,523

[22] Filed: Apr. 5, 1991

[51] Int. Cl.⁵ ............................................. F24C 15/20
[52] U.S. Cl. ................................ 126/299 R; 126/351; 169/65; 169/61; 169/54; 99/331; 99/337
[58] Field of Search ................ 126/299 R, 390, 351, 126/374; 169/56, 60, 61, 65, 54; 99/331, 337

[56] References Cited

U.S. PATENT DOCUMENTS

| | | | |
|---|---|---|---|
| 3,584,688 | 6/1971 | Duncan et al. | 169/65 X |
| 3,691,936 | 9/1972 | Chiarelli | 99/337 |
| 3,977,390 | 8/1976 | Fogel et al. | 126/351 X |
| 3,981,232 | 9/1976 | Williamson | 169/65 X |
| 4,102,330 | 7/1978 | Hutchinson | 126/351 X |
| 4,168,748 | 9/1979 | Batte | 169/61 X |
| 4,505,194 | 3/1985 | Bishop et al. | 99/336 |
| 4,520,717 | 6/1985 | Bohrer, Jr. et al. | 169/65 X |
| 4,815,694 | 3/1989 | Ferren et al. | 169/61 X |
| 4,964,471 | 10/1990 | Michalik et al. | 169/54 X |

Primary Examiner—Larry Jones
Attorney, Agent, or Firm—Leydig, Voit & Mayer

[57] ABSTRACT

A nozzle extends through an opening in the side wall of the vessel of a pressure fryer and normally is disposed in an inactive position in which discharge ports in the nozzle are sealed with respect to and are protected from the contents of the vessel. If a fire occurs, pressurized fire suppressant first extends the nozzle into the interior of the vessel to render ineffective the seal at the discharge ports. The suppressant then sprays through the discharge ports of the extended nozzle to extinguish the fire in the vessel.

7 Claims, 1 Drawing Sheet

FIRE SUPPRESSANT SYSTEM FOR A COOKING DEVICE

BACKGROUND OF THE INVENTION

This invention relates generally to a cooking device and more particularly to a pressure fryer of the type having a pressure-tight cooking vessel which is adapted to hold a bath of cooking oil and a food product such as chicken. The vessel of such a fryer may be heated either electrically or by a gas burner and is equipped with a removable cover which is adapted to be sealed to the vessel to establish a pressure-tight condition therein.

The fryer is operated by placing a quantity of cooking oil in the vessel, by activating the heater to raise the temperature of the oil, by placing the food product in the vessel and by then sealing the vessel with the cover. Pressure is generated in the vessel as the moisture in the product reaches the boiling point and vaporizes into steam. The pressure which is generated reduces the cooking time and also raises the boiling point of the juices in the product so that flavor is sealed in and less shrinkage occurs.

Pressure fryers of this general type are disclosed in Luebke et al U.S. Pat. Nos. 4,296,310 and 4,347,833. In abnormal situations, the oil in the vessel of such a fryer may become so hot that a fire starts in the vessel when the cover is unsealed. Present arrangements for extinguishing the fire include hand-held fire extinguishers or overhead fire extinguishing nozzles. Neither arrangement is very effective if the cover is in a closed but unsealed position on the vessel since the closed cover prevents the fire suppressant from reaching the fire in the vessel.

SUMMARY OF THE INVENTION

The general aim of the present invention is to provide a cooking device of the above general type and having a unique fire extinguishing nozzle located in the vessel itself so that a fire in the vessel may be extinguished even if the cover is in a closed position on the vessel.

Another object of the invention is to provide a fire extinguishing nozzle which is normally retracted out of the vessel and protected from the contents thereof but which, if a fire occurs, is automatically advanced into the vessel to effectively spray fire suppressant into the vessel and onto the fire.

A further object of the invention is to use pressurized fire suppressant to advance the nozzle to an active position in the vessel.

The invention also resides in the comparatively simple means for sealing the nozzle from the contents of the vessel under normal conditions while enabling the nozzle to advance and spray fire suppressant into the vessel if a fire breaks out.

These and other objects and advantages of the invention will become more apparent from the following detailed description when taken in conjunction with the accompanying drawings.

DETAILED DESCRIPTION OF THE PREFERRED EMBODIMENT

Figure 1:
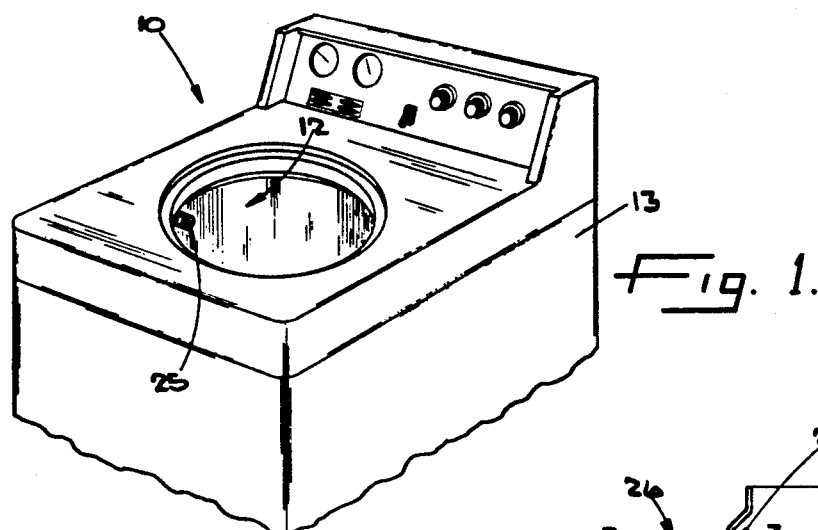
FIG. 1 is a fragmentary perspective view of a typical cooking device equipped with a new and improved fire suppressant system incorporating the unique features of the present invention.

As shown in the drawings for purposes of illustration, the invention is embodied in a cooking device which preferably is in the form of a pressure fryer 10 adapted to be used for cooking chicken, fish, potatoes and other food products under pressure and in a bath 11 (FIG. 2) of hot cooking oil. For the most part, the fryer is of conventional construction and thus the fryer itself has been shown and will be described only in sufficient detail to gain an understanding of the present invention.

In general, the fryer 10 comprises an open top vessel 12 supported by a cabinet 13 and defining a cooking well. Disposed within the lower portion of the vessel is an array of ring-like electrical resistance heating elements 14 (FIG. 2) adapted to be energized from an a.c. voltage source. Alternatively, the vessel may be heated by a gas-fired burner located outside of the vessel.

The vessel 12 is adapted to be sealed in a pressure-tight condition by a removable cover (not shown) which may be locked releasably to the top of the vessel. The vessel includes a vertical and generally cylindrical side wall 16 (FIG. 2) and further includes a frusto-conical section 17 located beneath the heating elements 14, there being a reduced diameter well 18 located beneath the frusto-conical section.

To use the fryer 10, the vessel 12 is filled with a suitable cooking oil and then the heating elements 14 are energized to raise the oil to a predetermined temperature. After the oil has been heated, the chicken or other food product is placed in a wire mesh basket (not shown) which then is inserted into the vessel 12 and immersed in the oil. The bottom of the basket usually is located near the upper end of the frusto-conical section 17. Any breading, crumbs or the like which may fall off of the food slides down the frusto-conical section and is collected in the well 18.

After the food product has been placed in the vessel 12, the cover is placed on the top of the vessel and is locked closed. During the cooking process, the moisture in the food product vaporizes and creates pressure in the vessel. Such pressure shortens the cooking time and also enhances the quality of the cooked product.

When the product has cooked for a predetermined period of time, the heating elements 14 are de-energized and the pressure within the vessel 12 is released. After the pressure drops, the cover may be unlocked and removed to enable removal of the product. The product most desirably is removed as soon as possible after the pressure is released in order to reduce the absorption of oil by the product.

Under abnormal conditions, the oil may become so hot that the oil flashes to fire as soon as the cover of the vessel 12 is unsealed. Conventional fire suppressant systems are not effective to rapidly extinguish fire in the vessel if the cover is in a closed but unsealed position on the vessel.

The present invention contemplates the provision of a new and improved fire suppressant system in which a fire extinguishing nozzle 25 is located in the vessel 12 but normally is retracted to an inactive position and is sealed and protected from the contents of the vessel. If a fire occurs, the nozzle 25 is automatically advanced into the interior of the vessel and into position to spray fire suppressant onto the fire.

More specifically, the nozzle 25 is supported to move between its inactive and active positions by a nozzle housing 26 (FIG. 3) having an elongated and cylindrical tubular portion 28 which extends into and is fastened within a circular opening 29 formed through the upright side wall 16 of the vessel 12 at an elevation above the normal level of the oil. Preferably, the inner end of the tubular portion 28 is flush with the inner side of the side wall 16 of the vessel. The tubular portion 28 may be welded or otherwise rigidly fixed to the side wall 16.

The nozzle housing 26 further includes an enlarged diameter cylindrical portion or cylinder 30 located adjacent the outer end of the tubular portion 28. A collar 31 is inserted into the inner end portion of the cylinder 30 and is formed with a bore 32 which receives the tubular portion 28 of the housing 26. The tubular portion 28 and the cylinder 30 are joined rigidly to the collar 31. For a purpose to be explained subsequently, a vent passage 33 is formed through the collar.

Figure 4:
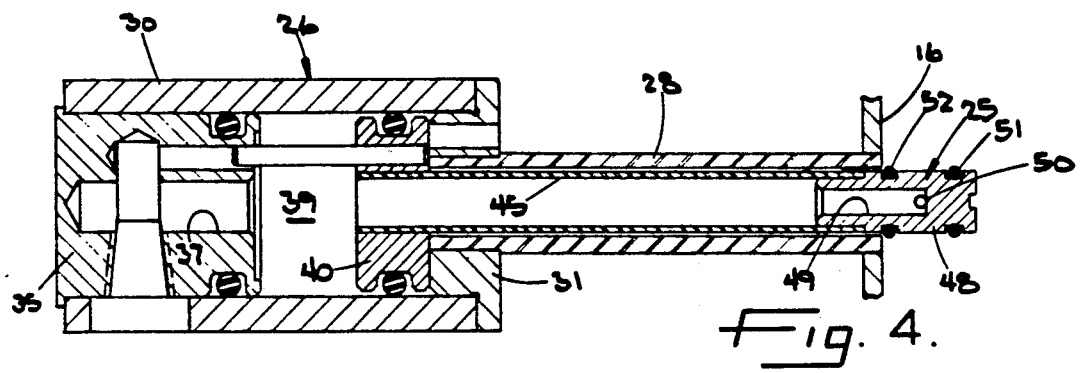
FIG. 4 is a view similar to FIG. 3 but shows the nozzle advanced to its active position.

Telescoped into and fixed rigidly within the outer end portion of the cylinder 30 is a plug 35 formed with a radially extending threaded bore 36 and with an axially extending bore 37 that communicates with the radial bore. The axial bore opens into a chamber 39 (FIG. 4) having one end defined by the inner end of the plug 35 and having an opposite end defined by a piston 40 which is telescoped slidably into the cylinder 30. O-rings 41 and 42 seal the plug 35 and the piston 40 with respect to the cylinder 30. Rotation of the piston within the cylinder is prevented by a rod or pin 43 which extends between and is connected rigidly to the piston and the plug.

A cylindrical tube 45 (FIG. 3) is fixed at its outer end portion within a bore 46 extending through the piston 40 while the outer end portion of the tube is fixed to the nozzle 25. The latter includes a generally cylindrical head 48 formed with an axially extending passage 49 that communicates with the tube 45. A hole 50 is drilled radially through the nozzle head 48 and communicates with the passage 50, opposite ends of the hole defining diametrically spaced and radially facing discharge ports (only one of the discharge ports being visible). O-rings 51 and 52 are carried by the nozzle head 48 on the inner and outer sides, respectively, of the discharge ports 50 and normally seal against the inside wall of the tubular portion 28 of the nozzle housing 26.

Figure 2:
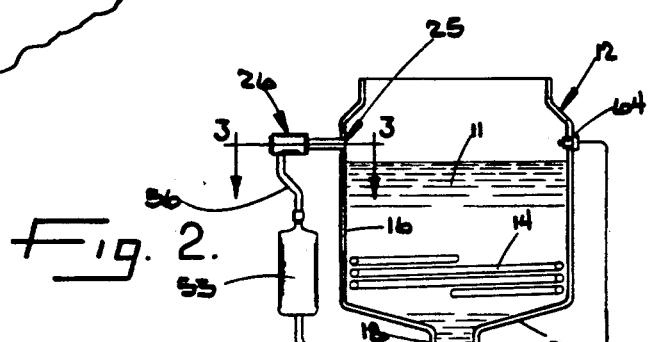
FIG. 2 is a schematic view of the vessel and the fire suppressant system of the cooking device.

As shown diagrammatically in FIG. 2, a cylinder 55 of fire suppressant such as a potassium-based solution sold under the trade designator ANSULEX is located alongside the vessel 12. The tank 55 is connected to the nozzle housing 26 by means of a hose 56 which is threaded into the tapped hole 36 in the plug 35. A second hose 58 establishes communication between the tank 55 and a pressurized nitrogen gas cartridge 60 by way of a control valve 62 which is associated with a temperature sensor 64 in the side wall 16 of the vessel 12.

Figure 3:
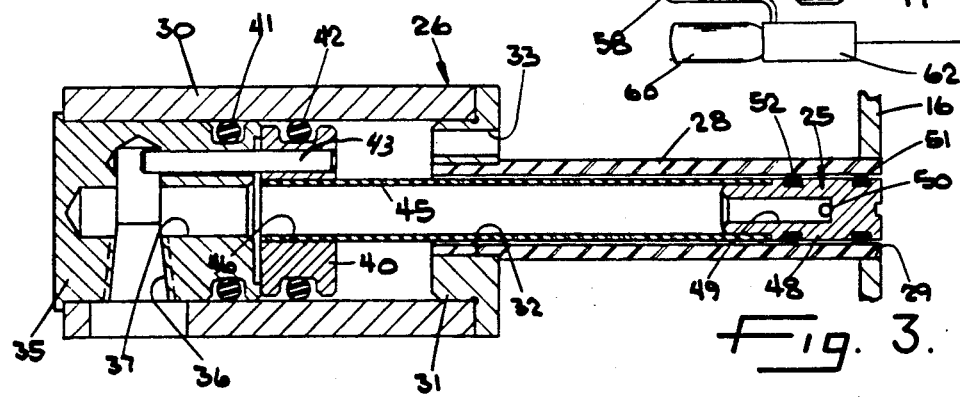
FIG. 3 is an enlarged fragmentary cross-section taken substantially along the line 3—3 of FIG. 2 and shows the nozzle of the fire suppressant system retracted to its inactive position.

Normally, the nozzle head 48 is located in an inactive position shown in FIG. 3. In this position, the discharge ports 50 are retracted well within the tubular portion 28 of the nozzle housing 26 and are sealed off from the interior of the vessel 12 by the inner O-ring 51. Thus, the discharge ports are prevented from being plugged or otherwise contaminated by oil and food product in the vessel.

If a fire occurs, the temperature sensor 64 triggers the control valve 62 to release the pressurized nitrogen in the cartridge 60. The pressurized gas flows to the tank 55 and pressurizes the fire suppressant therein. The pressurized suppressant is expelled from the tank 55 via the hose 56 and flows into the nozzle housing 26. Upon being admitted into the housing, the suppressant flows into the chamber 39 via the passages 36 and 37 and acts against the piston 40 to advance the piston, the tube 45 and the nozzle head 48 to the active position shown in FIG. 4, advance of the piston being permitted by the vent passage 33 in the plug 31. The nozzle head 48 and the seals 51 and 52 thus are advanced out of the tubular portion 28 of the nozzle housing 26 and are advanced into the interior of the vessel 12.

Fire suppressant admitted into the chamber 39 also flows through the tube 45 and the axial passage 49 in the nozzle head 48 to the discharge ports 50. Once the nozzle head 48 has been advanced sufficiently far that the O-ring 51 and the discharge ports 50 are clear of the tubular portion 28 of the housing 26, the suppressant is sprayed out of the ports and reacts with the hot oil in the vessel 12 to produce a cooling/sealing layer on the oil and thereby extinguish the fire.

From the foregoing, it will be apparent that the present invention brings to the art a cooking device 10 with a new and improved fire suppressant system in which a nozzle 25 is located in the vessel 12 itself but normally is retracted and is protected by the O-ring 51 from the contents of the vessel. When a fire occurs, the nozzle is automatically advanced into the vessel to enable the suppressant to spray out of the discharge ports 50 and extinguish the fire. The anti-rotation pin 43 keeps the ports oriented in a laterally facing direction so as to cause the suppressant to spray laterally across the bath 11 of oil.

The present suppressant system is effective both when the cover of the vessel 12 is open and when the cover is closed. A fire normally starts just when the cover is unsealed but before the cover is moved to its open position. Because the nozzle 25 is located in the vessel, the suppressant immediately starts extinguishing the fire without need of opening the cover to enable a suppressant to be directed into the vessel from the top thereof.

While the system has been specifically disclosed in connection with a temperature sensor 64 which causes the gas cartridge 60 to trigger, it will be appreciated that the cartridge may be triggered by a manual operation. Also, different types of fire suppressants and suppressant distribution systems may be used with the nozzle 25.

I claim:

1. Cooking apparatus comprising a vessel adapted to hold food product and cooking oil, means for heating said vessel, and means for suppressing fire in said vessel, said fire suppressing means comprising a nozzle housing attached to said vessel, a nozzle slidable in said housing and having a discharge port communicating with said housing, said nozzle normally being disposed in an inactive retracted position in said housing, means for sealing said discharge port from the interior of said vessel when said nozzle is in said inactive position, a source of fire suppressant, means for selectively admitting pressurized suppressant into said housing for flow through said nozzle and out of said discharge port, and means responsive to the admission of suppressant into said housing for advancing said nozzle from said inactive position to an active position rendering said sealing means ineffective and permitting said suppressant to discharge through said port and into said vessel.

2. Cooking apparatus as defined in claim 1 in which said vessel includes an upright side wall having an opening therethrough, said housing comprising a tubular portion connected to said vessel and aligned with said opening, said nozzle comprising a head telescoped slidably into the tubular portion of said housing and having inner and outer ends, said discharge port being located between the ends of said head, and said sealing means being located between said discharge port and the inner end of said head and establishing a seal between said head and the tubular portion of said housing when said nozzle is in said inactive position.

3. Cooking apparatus as defined in claim 2 in which said housing further includes a cylinder connected to said tubular portion, said advancing means comprising a piston slidably received in said cylinder and connected to said nozzle, said piston sliding in one direction in said cylinder in response to the admission of pressurized suppressant into said housing.

4. Cooking apparatus comprising a vessel having an upright side wall with an opening therethrough, said vessel being adapted to hold food product and cooking oil, means for heating said vessel, and means for suppressing fire in said vessel, said fire suppressing means comprising a housing attached to said side wall, said housing having an outer cylinder located outside of said side wall and having an inner tubular portion extending into said opening, a nozzle having a head telescoped slidably in said tubular portion and having a piston telescoped slidably in said cylinder, said head having inner and outer ends and having a radially opening discharge port located between said ends, said nozzle normally being located in an inactive position in which said port is located in said tubular portion, sealing means located between said port and the inner end of said head and acting between said head and said tubular portion to establish a seal between said port and the interior of said vessel, a source of fire suppressant, and means for selectively admitting pressurized suppressant into said housing, said suppressant acting against said piston to advance said nozzle to an active position within said vessel, said sealing means being rendered ineffective when said nozzle is in said active position and permitting said suppressant to discharge through said port and into said vessel.

5. Cooking apparatus as defined in claim 4 further including an axially extending passage in said head and communicating with said discharge port, an axially extending hole through said piston, and a tube joining said piston to said head and establishing communication between said cylinder and said passage via said hole.

6. Cooking apparatus as defined in claim 4 in which said sealing means comprise an O-ring carried by said head between said port and the inner end of said head.

7. Cooking apparatus as defined in claim 4 in which the inner end of said head is substantially flush with the inside of said upright wall when nozzle is in said inactive position.

* * * * *